(12) United States Patent
Turlakov et al.

(10) Patent No.: US 11,181,333 B2
(45) Date of Patent: Nov. 23, 2021

(54) METHOD AND APPARATUS FOR PRODUCING RIFLINGS IN BARRELS OF GUNS

(71) Applicants: AEC—ALPEN ENERGY CONSULTING GMBH, Feistritz im Rosental (AT); EMAG SALACH GMBH, Salach (DE)

(72) Inventors: Maxim Turlakov, Ferlach (AT); Robin Göhringer, Gschwend (DE)

(73) Assignees: AEC-ALPEN ENERGY CONSULTING GMBH, Feistritz im Rosental (AT); EMAG SALACH GMBH, Salach (DE)

( * ) Notice: Subject to any disclaimer, the term of this patent is extended or adjusted under 35 U.S.C. 154(b) by 0 days.

(21) Appl. No.: 16/308,598

(22) PCT Filed: Jun. 9, 2017

(86) PCT No.: PCT/EP2017/064189
§ 371 (c)(1),
(2) Date: Dec. 10, 2018

(87) PCT Pub. No.: WO2017/212051
PCT Pub. Date: Dec. 14, 2017

(65) Prior Publication Data
US 2019/0154383 A1 May 23, 2019

(30) Foreign Application Priority Data
Jun. 9, 2016 (WO) ................ PCT/AT2016/000062

(51) Int. Cl.
*F41A 21/18* (2006.01)
*B23H 3/00* (2006.01)
(Continued)

(52) U.S. Cl.
CPC ................ *F41A 21/18* (2013.01); *B23H 3/00* (2013.01); *B23H 9/005* (2013.01); *B21C 37/152* (2013.01); *B23H 9/14* (2013.01)

(58) Field of Classification Search
CPC . F41A 21/16; F41A 21/18; B23H 3/00; B23H 9/005; B23H 9/14; B23H 9/16; B21C 37/152; B21C 37/153
(Continued)

(56) References Cited

U.S. PATENT DOCUMENTS 1,886,218 A * 11/1932 Olin ........................ F41A 21/04
42/76.02
2,848,401 A * 8/1958 Hartley .................... B23H 9/14
205/652
(Continued)

FOREIGN PATENT DOCUMENTS

DE 102014209432 11/2015

OTHER PUBLICATIONS

International Search Report (English) and Written Opinion dated Nov. 15, 2017, from International Application No. PCT/EP2017/064189, 22 pages.
(Continued)

*Primary Examiner* — Stephen Johnson
*Assistant Examiner* — Benjamin S Gomberg
(74) *Attorney, Agent, or Firm* — Meunier Carlin & Curfman LLC

(57) ABSTRACT

Methods and apparatuses are described herein for producing a rifling in a barrel of a gun. The barrel defines an axis in a longitudinal direction and comprises an inner wall that defines a bore extending in the longitudinal direction. A tool includes a tool head having an outer contour that corresponds to a shape of the rifling to be produced. The tool head consists of an electrically conductive material. The outer
(Continued)

contour of the tool head and the inner wall of the barrel define a gap. An electrolyte solution is pumped through the gap while the tool is guided through the bore, and a pulsed electrical voltage is applied to the barrel and the tool. The barrel is the anode and the tool head is the cathode. The tool is moved through the bore and rotated about the longitudinal axis while the pulsed voltage is applied to produce the riflings.

5 Claims, 5 Drawing Sheets

(51) Int. Cl.
  *B23H 9/00* (2006.01)
  *B21C 37/15* (2006.01)
  *B23H 9/14* (2006.01)

(58) Field of Classification Search
  USPC ..................................... 42/78, 76.1; 89/14.7
  See application file for complete search history.

(56) References Cited

U.S. PATENT DOCUMENTS

| | | | | |
|---|---|---|---|---|
| 2,990,342 A * | 6/1961 | Sullivan | ................ | C25D 11/04 205/131 |
| 3,271,283 A * | 9/1966 | Clifford | ................ | B23H 3/00 205/649 |
| 3,630,878 A * | 12/1971 | Haggerty | ................ | B23H 9/14 204/225 |
| 3,645,881 A * | 2/1972 | Williams | ................ | C25D 7/04 204/288.1 |
| 4,690,737 A | 9/1987 | Vishnitsky | | |
| 5,004,529 A * | 4/1991 | Vishnitsky | ................ | B23H 9/06 204/212 |
| 5,242,556 A * | 9/1993 | Masuzawa | ................ | B23H 3/00 204/DIG. 9 |
| 5,476,581 A * | 12/1995 | Reckeweg | ................ | C25D 7/04 205/122 |
| 5,819,400 A * | 10/1998 | Sargeant | ................ | C25F 7/00 29/825 |
| 5,856,631 A | 1/1999 | Julien | | |
| 6,139,715 A * | 10/2000 | Wei | ................ | B23H 3/00 204/224 M |
| 6,387,242 B1 * | 5/2002 | Wei | ................ | B23H 9/00 204/224 M |
| 6,562,216 B2 * | 5/2003 | Schlenkert | ................ | F41A 21/22 205/104 |
| 6,594,936 B1 * | 7/2003 | Sniezak | ................ | F41A 21/04 42/76.02 |
| 8,663,450 B1 * | 3/2014 | Kathe | ................ | B23H 9/14 205/686 |
| 10,682,715 B2 * | 6/2020 | Luo | ................ | B23H 11/00 |
| 10,864,567 B2 * | 12/2020 | Pingilley | ................ | C25D 5/022 |
| 2016/0311043 A1 | 10/2016 | Garn et al. | | |
| 2019/0314879 A1 * | 10/2019 | Pingilley | ................ | C25D 17/10 |

OTHER PUBLICATIONS

International Search Report (English) and Written Opinion dated Feb. 7, 2017, from International Application No. PCT/AT2016/000062, 12 pages.

Rajurkar et al. "Modelling and Monitoring Interelectrode Gap in Pulse Electrochemical Machining", CIRP Annals, vol. 44, No. 1, Jan. 1, 1995, pp. 177-180.

* cited by examiner

Detail B

METHOD AND APPARATUS FOR PRODUCING RIFLINGS IN BARRELS OF GUNS

BACKGROUND

Riflings are the helical or spiral-shaped, preferably continuously formed recesses or grooves in the barrel of a handgun or of a cannon, which give the projectile a spin around its longitudinal axis during its movement through the barrel and thereby stabilize the bullet trajectory. In the production of these grooves in the barrel, the material is therefore typically removed in the area of the grooves. The areas remaining between the riflings are called fields. The production of the riflings is part of the so-called finishing, i.e. the barrel already has its bore and its shaping is largely completed. It is therefore important that high temperatures, which could cause deformation of the barrel, are avoided as far as possible in the manufacture of the riflings.

An advantageous process in this respect is the ECM process (Electrochemical Machining), as described for example in U.S. Pat. No. 3,630,878. In this process, a tool is guided through a tubular workpiece, the barrel, while an electrolyte solution is pumped between the tool and the inner surface of the workpiece. The process is based on the principle of electrolysis, whereby material is removed from the anode as the metal atoms are ionized and dissolved. A DC voltage source is applied to the tool and workpiece, whereby the workpiece, the barrel, is the anode. No material is removed from the cathode, the tool. In this process, the electrolyte solution acts at the same time as a coolant and thus prevents the workpiece from heating up too much. The outer surface of the tool facing the inner wall of the workpiece comprises an area for bore surface machining and finishing and integrated therewith an area for segmented groove insertion and finishing. The processing and finishing areas of the cathode are made of metal. In the segmented area insulators are provided between the metallic areas. In principle, this means that two processing steps are carried out simultaneously. However, this requires an overall larger material removal and leads to a longer processing time combined with high energy consumption. In addition, the structure of the tool is very complex and the manufacture of the tool is therefore cumbersome and cost-intensive. In particular, the construction of the segmented area, in which insulators and metal must be connected with sufficient stability to withstand the pressure of the electrolyte flow, is very cumbersome.

Another method and a corresponding apparatus for producing riflings in barrels using the ECM process is described in U.S. Pat. No. 4,690,737. Here, too, a tool for creating the riflings inside the barrel is guided through the barrel. The tool also has a segmented area on its outer side facing the inner wall of the workpiece in which metallic and non-metallic (insulator) areas are arranged spirally next to each other. This device is used exclusively for the production of the riflings and the corresponding process is therefore more efficient than the process described above, disclosed in U.S. Pat. No. 3,630,878, as less material has to be removed. However, also here the production of the workpiece is complex and cost-intensive. Although the insulator areas on the workpiece may consist of simple insulation strips, this leads to a shorter tool life under the prevailing, wear-intensive process conditions.

However, the ECM process can sometimes encounter difficulties in producing particularly smooth and uniform surfaces, which is critical to the accuracy of gun barrels, particularly when machining the inner wall of gun barrels. The precision of mechanical machining processes has increased so much in recent decades that the ECM process is threatening to reach its limits in terms of precision. The PECM method is a much more precise method, but it is based on the same principle. The letter P is interchangeably interpreted for both "Precise" and "Pulsed". The PECM method is described, for example, in the scientific publication *Modelling and Monitoring Interelectrode Gap in Pulse Electrochemical Machining*, Rajurkar et al., Annals of the CIRP Vol. 44/1/1995. The pulsed voltage source provides improved process control to prevent surface defects caused by void formation and uneven electrolyte flow. The use of this process is described, for example, in the surface treatment of turbine blades. The advantages of the process can be obtained by reducing the gap width between tool and workpiece during machining. During each pulse cycle, the tool is approached to the workpiece by the distance corresponding to the material removal during the time when no voltage is applied. The tool thus moves in the direction of the workpiece during each cycle in order to restore the original, very narrow gap width between tool and workpiece. This is shown in FIG. 1 of the above-mentioned publication.

However, the PECM process cannot be applied to the manufacture of riflings in barrels of guns. This is because, as a result of the system, it is not possible to approach the tool to the workpiece during machining because the tool and workpiece are coaxial with each other or move coaxially with each other. So when the tool approaches the inner wall of the barrel on one side, it simultaneously moves away from the inner wall of the barrel on the opposite side.

There is therefore still a need for a more precise process for manufacturing riflings in barrels of guns.

BRIEF SUMMARY

The purpose of the present invention is therefore to provide such a more precise method and an apparatus for carrying out the method, which can be manufactured and operated easily and inexpensively at the same time.

The present invention concerns a process for manufacturing riflings in barrels of guns by means of electrochemical machining of metals and an apparatus for carrying out the process in accordance with the invention. In particular, the present invention relates to the PECM process and a corresponding apparatus which, in the manufacture of barrels, enables a highly uniform removal of material and thus creates a very smooth surface on the inside of the barrels of guns.

In the context of this invention, it was found that a pulsed voltage source leads to an improved surface during the production of the riflings, although it is not possible to ensure that the tool "moves" towards the inner wall of the barrel and thus a constant gap width during machining.

The present invention thus provides, as a first aspect, a method of producing riflings in barrels of guns, including a barrel as a workpiece which defines an axis in its longitudinal direction and which has a bore extending in the longitudinal direction which defines an inner wall of the barrel, and a tool, having a tool head which has an outer contour, consisting of an electrically conductive material, which corresponds to the shape of the riflings to be produced, wherein an electrolyte solution is passed through the bore of the barrel while the tool is guided through the bore of the barrel.

According to the invention, a pulsed electrical voltage is applied to the workpiece and tool, with which a direct current is generated, the workpiece being the anode and the tool head being the cathode, the barrel being positioned vertically with its longitudinal direction, wherein between the electrically conductive outer contour of the tool head and the inner wall of the barrel there is a gap which surrounds the tool head and through which the electrolyte solution flows, and the tool being moved relatively to the workpiece through the bore of the barrel during the application of the pulsed voltage and simultaneously being rotated about the axis, thereby creating the grooves on the inner wall of the bore.

The vertical alignment of the barrel offers two major advantages. Firstly, gravity in this arrangement favours the removal of dissolved metal ions and secondly, the negative gravitational effects that occur in a horizontal orientation, such as deflection of the barrel due to its own weight, are eliminated. Barrel lengths of 1500 mm and more can be machined without any problems.

In accordance with a preferred embodiment of the method according to the invention, during the production of the riflings the tool is moved relatively to the workpiece through the bore of the barrel by means of an electronic control. Improved precision and reproducibility can be achieved herewith.

According to another preferred embodiment of the method according to the invention, the pulsed voltage has time intervals in which the direct current alternatingly flows and does not flow. The time interval in which the direct current does not flow cooperates with the speed at which the electrolyte solution is pumped through the barrel in such a way that the electrolyte solution within the gap is exchanged during this time interval. This improves the surface quality of the inner wall of the barrel, as no uncontrolled differences in concentration of the metal ions dissolved from the workpiece occur within the gap, which could result in uneven electrolysis.

According to another preferred embodiment of the method according to the invention, the electrolyte solution is adjusted to a specific temperature before passing through the barrel. This also contributes to improved surface quality and reproducibility of the result.

According to another preferred embodiment of the method according to the invention, the electrolyte solution flows in the same direction as the tool is guided through the barrel during the creation of the riflings. As an alternative and according to a further embodiment of the method according to the invention, the electrolyte solution can also flow in the opposite direction as the tool is guided through the barrel during the creation of the riflings. Thereby, despite the opposite concentration gradient of the dissolved metal ions within the gap in vertical direction, a comparable surface quality is achieved.

As a second aspect, the present invention provides an apparatus for the production of riflings in the barrels of guns, in which at least one barrel to be machined as a workpiece can be accommodated perpendicularly in the apparatus with its longitudinal direction. The apparatus having at least one upper and at least one lower receptacle by means of which the at least one barrel can be held, wherein said apparatus comprises means for passing, preferably pumping, an electrolyte solution through said at least one barrel, and wherein said apparatus comprises means for guiding a tool through said at least one barrel. The tool can be guided through the barrel at the same time as the electrolyte solution is passed, preferably pumped, through the barrel.

According to the invention, the apparatus has means for applying a pulsed electrical voltage to the workpiece and the tool, at least while the tool is being guided through the barrel.

According to a preferred embodiment of the apparatus according to the invention, the apparatus is configured so as to be able to carry out the method according to the invention.

According to a further preferred embodiment of the apparatus according to the invention, the apparatus has means for passing compressed air through the at least one barrel. This allows the electrolyte solution in the barrel to be quickly, easily and residue-free removed from the barrel at the end of processing.

According to a further preferred embodiment of the apparatus according to the invention, the distance between the at least one upper receptacle and the at least one lower receptacle is variable. Furthermore, the lower receptacle is preferably attached to a height-adjustable mounting device. This means that different lengths of barrels can be machined with the same apparatus. In addition, the barrel can be installed and removed in a particularly user-friendly manner.

According to a further preferred embodiment of the apparatus according to the invention, the apparatus further has means for passing a further fluid in addition to the electrolyte solution through the at least one barrel. The other fluid is preferably purified water, with which the electrolyte residues can be flushed out and any salt residues inside the barrel can be easily avoided or removed without residue.

According to a further preferred embodiment of the apparatus according to the invention, the at least one upper receptacle and the at least one lower receptacle have ports through which the electrolyte solution and, if necessary, the compressed air and the further fluid can be pumped. The ports can thus remain as they are when the workpiece is changed. The new workpiece is simply inserted into the receptacles respectively fastened in them and the production of further riflings can take place without delay respectively be followed.

According to a further preferred embodiment of the apparatus according to the invention, receptacles have controllable valves in the region of the ports. In this way a constant pressure can be applied to the respective supply lines for the liquids or the compressed air and the passing of the respective medium through the barrel can be carried out by a central control of the valves.

According to a further preferred embodiment of the apparatus according to the invention, the apparatus has an electronic control system. As has already been described in connection with an embodiment of the method according to the invention, this increases the reproducibility of the result. At the same time, user-friendliness is increased.

According to a further preferred embodiment of the apparatus according to the invention, the apparatus has a measuring device with which conclusions can be made about the progress of the production of the riflings on the basis of the consumed electrolyte solution. For example, probes or electrodes may be used to measure the concentration of certain ions in the electrolyte solution. On the basis of the difference in concentration of the spent solution compared to the fresh solution introduced or passed through, statements can be made about the depth of the riflings during the ongoing machining process that is online.

According to a preferred embodiment of the apparatus according to the invention, the means for guiding the tool through the at least one barrel can furthermore make the tool rotate about the longitudinal axis of the barrel. This ensures an increase in process reliability and stability.

According to a preferred embodiment of the apparatus according to the invention, at least two barrels can be accommodated in the apparatus and be machined simultaneously. Some of the preferred embodiments described above thus work together synergistically. For example, a central electrolyte, fluid and compressed air supply can be provided, whereby the valves in the holders of the individual machining units can be controlled separately. This increases efficiency and lowers the cost of producing riflings in barrels of guns.

According to a preferred embodiment of the apparatus according to the invention, the apparatus further comprises the tool, wherein the tool has a tool rod and a tool head. The tool head is made of an electrically conductive, metallic material and has spiral projections on its circumferential surface facing the inner wall of the barrel during the production of the riflings. Preferably the tool head has no insulators between the spiral projections. It turned out that the surface quality is not affected by such considerably cost-effective tool heads.

The term "vertical" refers to the corresponding orientation relative to the Earth's surface.

BRIEF DESCRIPTION OF THE DRAWINGS

Certain embodiments of the invention are subsequently described by reference to the drawings, whereby.

DETAILED DESCRIPTION

Figure 1:
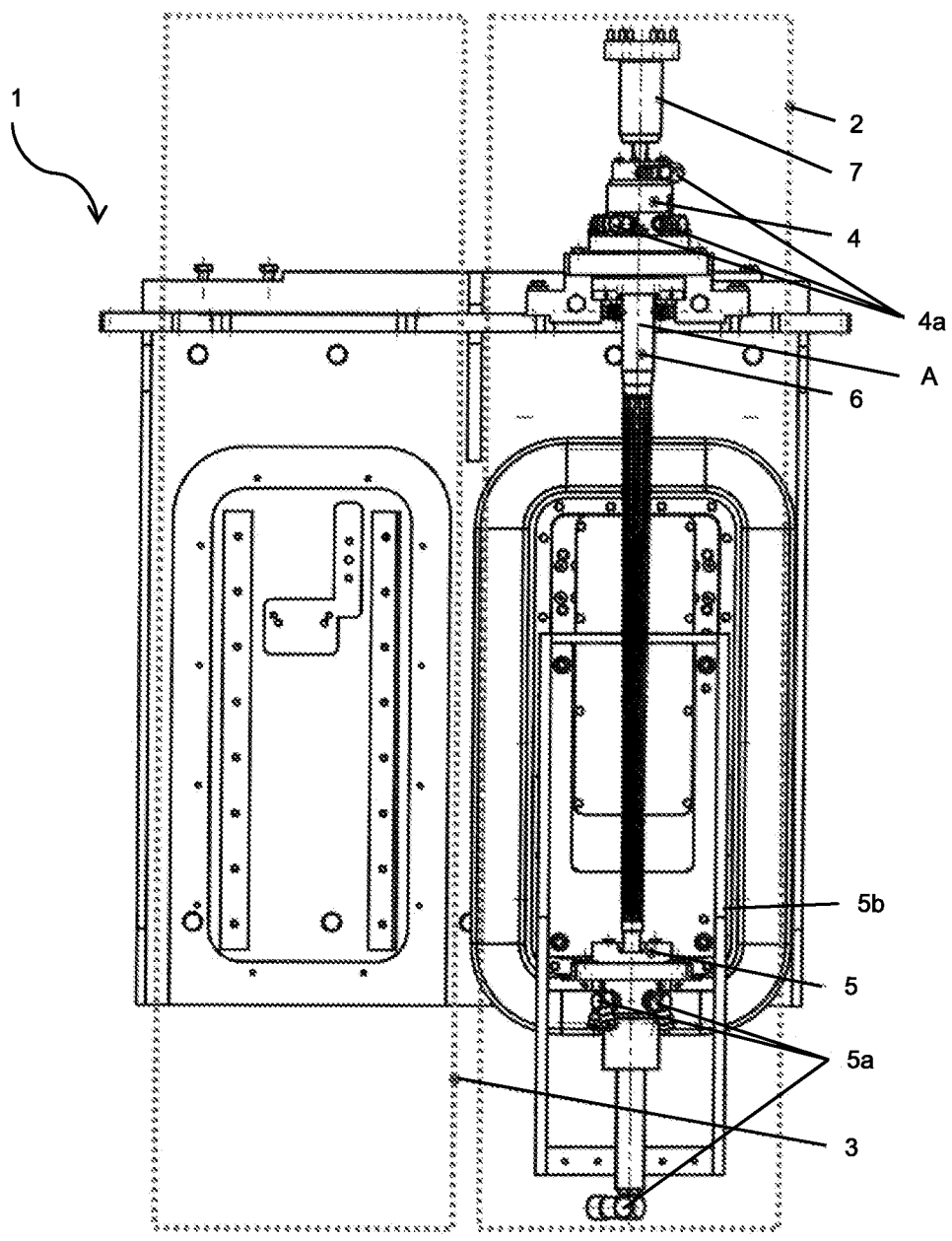
FIG. 1 shows a front view of an apparatus according to an embodiment of the apparatus according to the invention.
Figure 3:
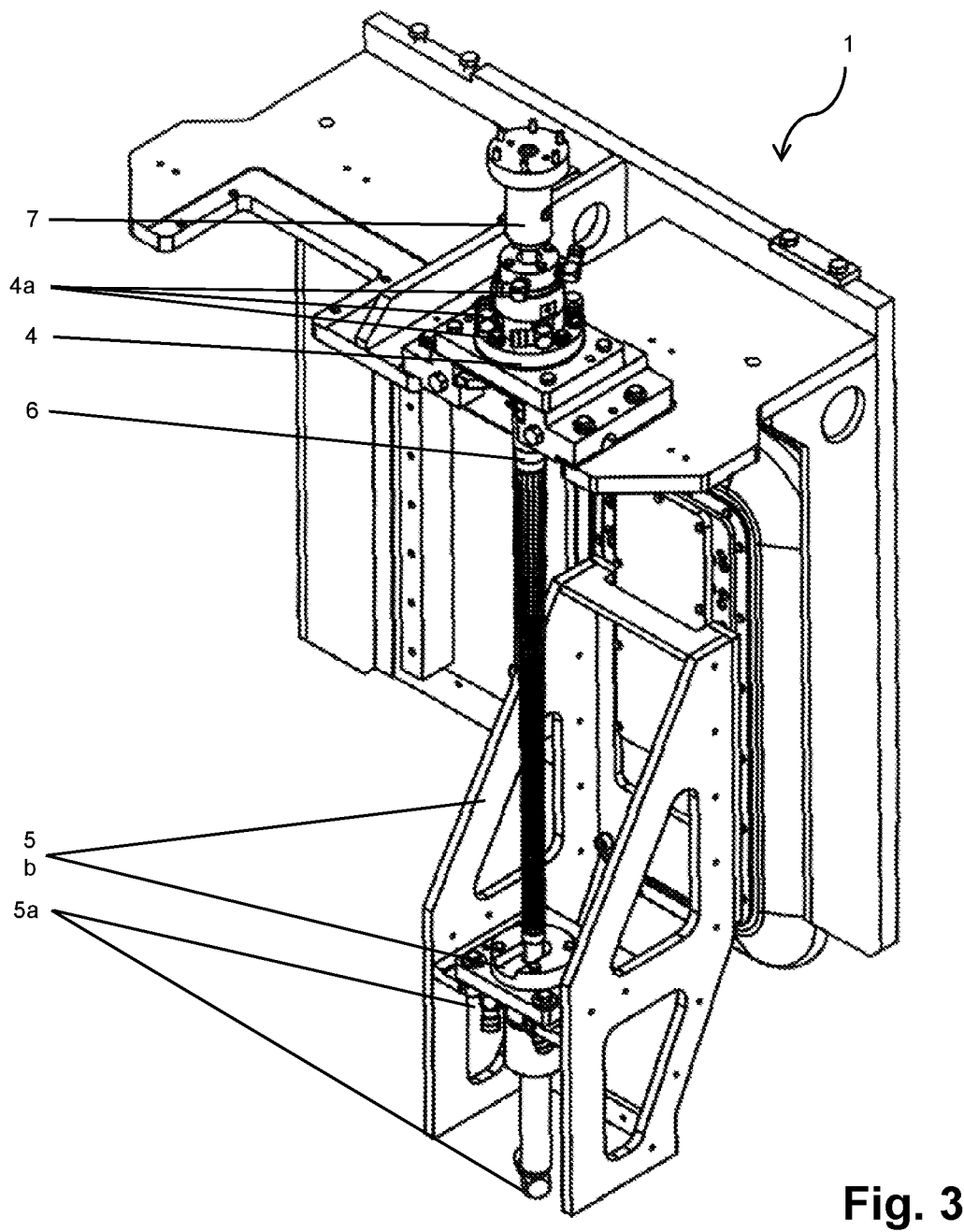
FIG. 3 shows a perspective view of an apparatus according to an embodiment of the apparatus according to the invention.
Figure 4:
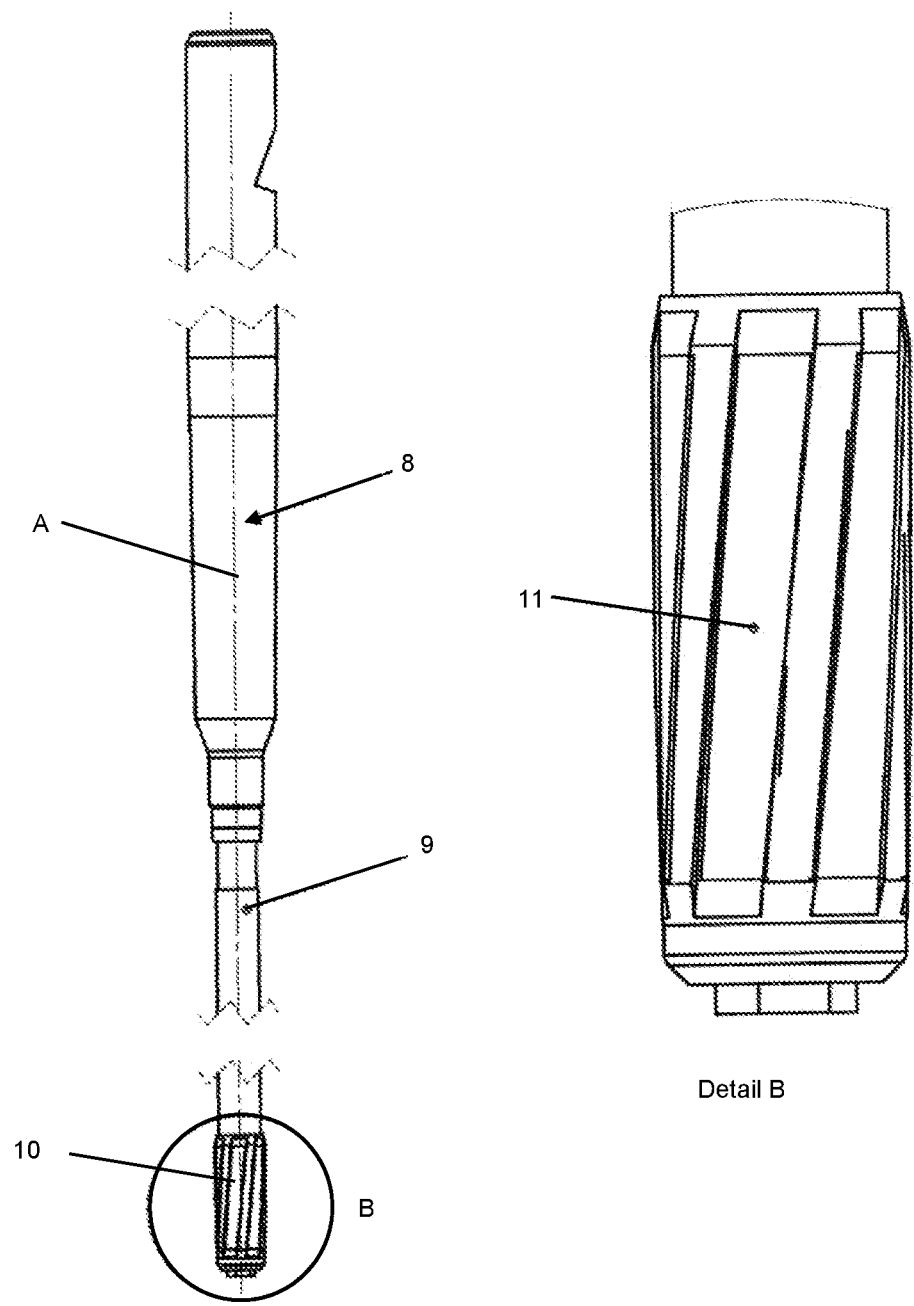
FIG. 4 shows a view of a tool according to an embodiment as well as an enlarged section of the tool head of the apparatus according to the invention and FIG. 5 shows a flowchart of a method according to an embodiment of the invention.

The design shown in FIG. 1 shows a device 1 with two machining units 2, 3. The right unit 2 is equipped with the corresponding components of the device according to the invention. The left unit 3 is not used in the example of the apparatus 1 according to invention shown in FIG. 1, but can be equipped accordingly, so that a parallel machining of barrels can take place with units 2 and 3. In unit 3 or fixture 1 the barrel 6 is vertically clamped in the receptacles 4, 5. The type of fastening in the receptacles is not particularly limited. As shown in FIG. 3 on the lower receptacle 5, barrel 6 can be pushed into receptacle 5 from the front and can be held form-fit at the intended position in receptacle 5, e.g. barrel 6 can snap into a suitable holder.

Figure 2:
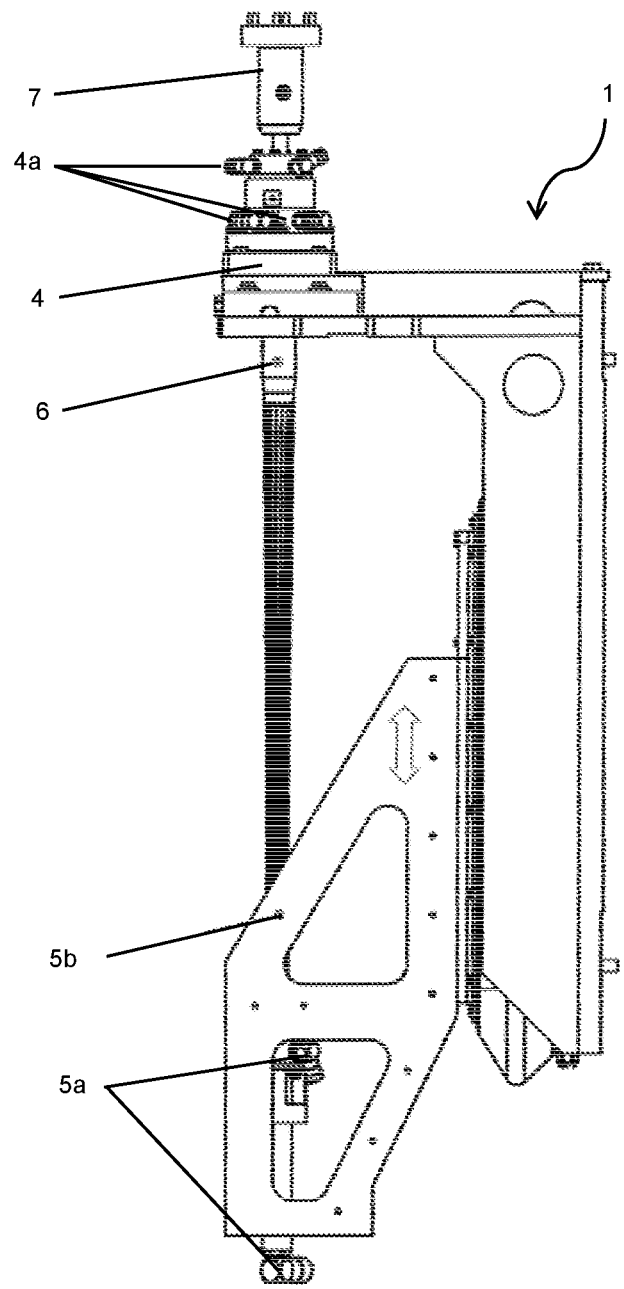
FIG. 2 shows a side view of an apparatus according to an embodiment of the apparatus according to the invention.

The fixing of the barrel 6 to the upper receptacle 4 is the same as for the receptacle 5, but it is also possible to move the barrel 6 upwards by moving the lower receptacle 5 vertically, as illustrated in FIG. 2 with the corresponding arrows, into an opening of the upper receptacle 4 provided for the barrel 6, by means of which the barrel 6 is then fixed. When the machining position is reached, the lower movable receptacle 5 is locked (not shown). The barrel is now in the target position for machining and the production of the riflings can be carried out according to the method of the invention. However, any other suitable method of fastening is possible. As can be seen in FIGS. 2 and 3, the lower receptacle 5 is preferably provided as a vertically movable or displaceable, sufficiently stable steel construction as mounting device 5b, into which the barrel is mounted. The mounting device 5b, for example, is fixed to a wall by means of a sliding rail. Steel plates with a thickness of more than 10 mm are particularly preferred in the steel construction.

As shown in FIGS. 1 to 3, a means 7 for guiding a tool 8 through the at least one barrel 6, e.g. an electronically controllable robot unit, is located above the upper receptacle 4, with which the tool can also be rotated about the longitudinal axis A in addition to the movement relative to the barrel 6 in the vertical direction.

Ports 4a, 5a are provided at the receptacles 4, 5. The respective supply lines or hose lines (not shown) for the supply of electrolyte solution, as well as water and compressed air, if necessary, are connected to ports 4a, 5a. The construction of the receptacles 4, 5 is massive, as they have to withstand high pressures. At the same time, in this version, the tool must be able to be inserted through the upper receptacle 4 into the barrel and moved in it. This requires the sealing of all pressure-loaded components against each other. Preferably, therefore, the receptacles 4, 5 are made of solid metal, further preferably steel. The tool rod 9 is preferably guided through one or more sealing rings, preferably made of polytetrafluoroethylene.

The type and concentration of suitable electrolyte solutions are not particularly limited. In principle, all common ECM and PECM solutions can be used.

The pulsed electrical voltage is also not particularly limited. The expert is familiar with the usual ranges for this, whereby these depend, among other things, on the type of metal of the barrel 6, as well as on the calibre and circumferential surface of the tool head 10. According to a preferred embodiment, however, the time intervals of the on-time and off-time of the voltage and thus of the direct current flow are adjusted in such a way that no caving effects occur and, furthermore, in such a way that the speed of the electrolyte flow in the gap is sufficient to exchange the electrolyte solution in the gap during the off-time.

The exact design of the outer contour of the tool head 10 or the design of the spiral-shaped projections 11 on it is not particularly restricted either and depends on the requirements and the intended use of the gun. Preferably, however, the tool head does not have any insulators.

Figure 5:
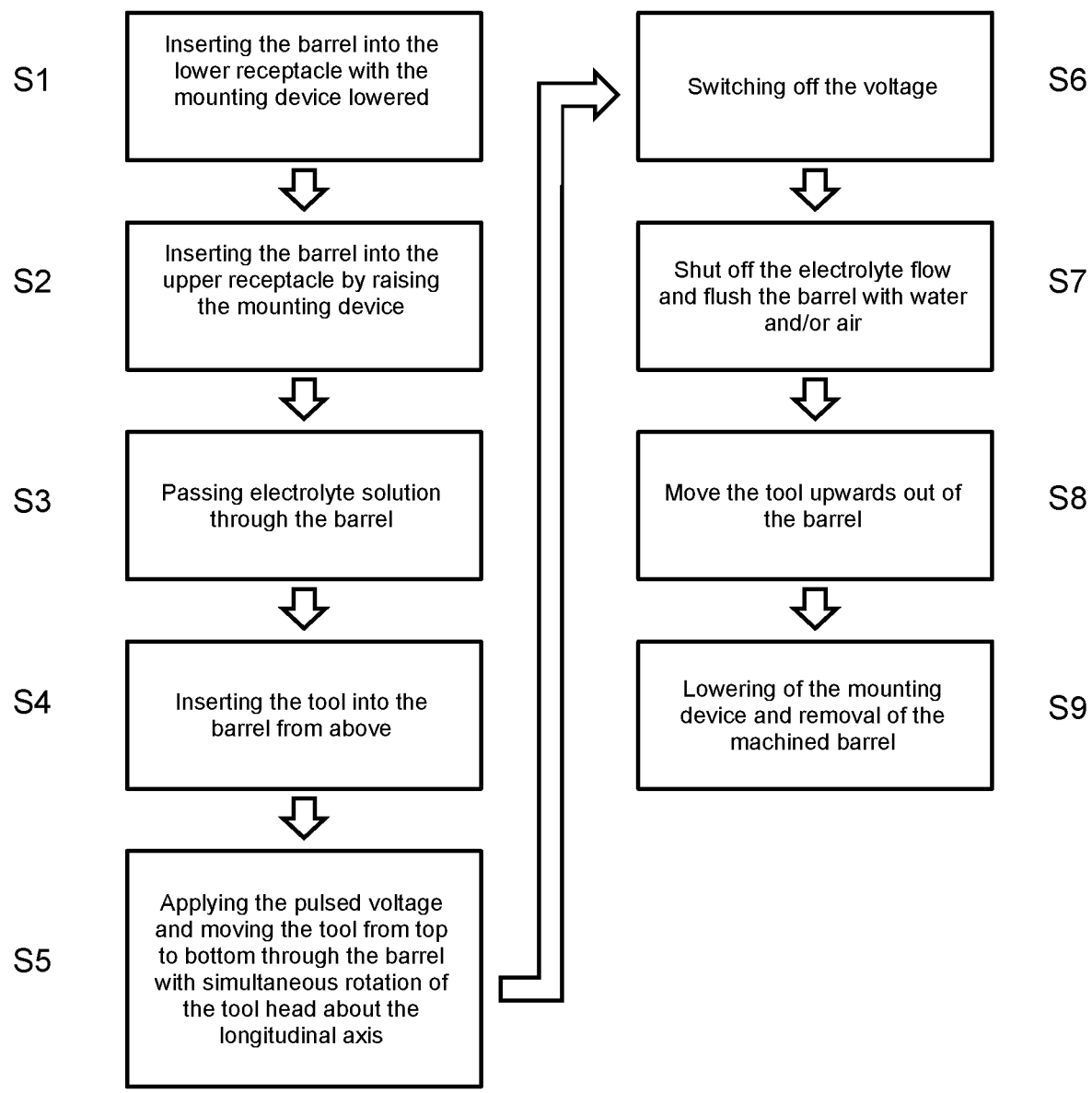

According to the method according to the invention for the production of riflings in barrels of guns including a barrel 6 as workpiece which defines an axis A in its longitudinal direction and which has a bore extending in the longitudinal direction, which defines an inner wall of the barrel, and a tool 8, having a tool head 10, which has an outer contour consisting of an electrically conductive material which corresponds to the shape of the riflings to be produced, is first clamped in or fastened in the apparatus 1 in accordance with the flow diagram shown as an example of an embodiment in FIG. 5. In the apparatus 1 which is ready for mounting, the mounting device 5b on the lower receptacle has moved downwards. The barrel is first fixed to the lower receptacle 51 and by raising the mounting device 5b, the upper end of the barrel is fixed to the upper receptacle S2 by sliding it into an opening provided for this purpose in the upper receptacle. The mounting device 5b is then locked for safety reasons. An electrolyte solution is then passed through the bore of the barrel 6 (S3), which is vertically positioned in its longitudinal direction in units 4, 5. As soon as there is a sufficient amount of electrolyte solution in the barrel, the tool 8 is inserted into the bore of barrel 6 S4. A pulsed electrical voltage is then applied to workpiece 6 and tool 8 to generate a corresponding pulsed direct current S5. The workpiece 6 forms the anode and the tool head 10 the cathode. During the insertion and guiding through S5 of the tool head 10 into the bore of the barrel 6, a gap is formed between the electrically conductive outer contour of the tool head 10 and the inner wall of the barrel 6, surrounding the tool head 10. The electrolyte solution flows through it. While applying the pulsed voltage, tool 8 is moved relative to the workpiece or barrel 6 through the bore of barrel 6 and simultaneously rotates around axis A S5. By removing the material by means of the electrochemical reaction, the riflings are created on the inner wall of the bore of barrel 6.

The tool 8 is moved during the production of the riflings by means of an electronic control relative to the workpiece 6 through the bore of the barrel 6.

The pulsed voltage has time intervals in which the direct current alternatingly flows and does not flow, whereby the time interval in which the direct current does not flow cooperates with the speed at which the electrolyte solution is passed or conveyed through the barrel 6 in such a way that the electrolyte solution is exchanged within the gap during this time interval.

The electrolyte solution is adjusted to a specific temperature before being introduced into barrel 6.

During the machining phase, the electrolyte solution is moved through barrel 6 in the same direction as the tool 8 is moved through barrel 6 during the generation of the riflings. Alternatively, the electrolyte solution can be moved in the opposite direction to tool 8 when it is guided through barrel 6 during the creation of the riflings.

After the complete crossing of the barrel 6 with the tool 8, the production of the riflings in barrel 6 is completed. The pulsed voltage is switched off S6, the electrolyte flow is switched off S7 and the barrel together with the tool is flushed with water and/or air in order to remove material and electrolyte residues from the barrel and from the tool as residue-free as possible S7. Tool 8 is returned to the starting position S8 and the barrel 6 or the barrels 6 are removed from the apparatus 1 S9 after lowering the mounting device 5b and releasing the barrels from the receptacles 4, 5. If necessary, a further flushing of the barrel 6 takes place before removing the barrel 6.

LIST OF REFERENCE SIGNS

1 Apparatus
2 First machining unit
3 Second machining unit
4 Upper receptacle of the workpiece
4a Ports for electrolyte solution etc.
5 Lower reception of the workpiece
5a Ports for electrolyte solution etc.
5b Mounting device
6 Barrel/workpiece
7 Means for guiding a tool through the barrel
8 Tool
9 Tool rod
10 Tool head
11 Spiral projections
A Longitudinal axis of barrel

The invention claimed is:

1. A method for producing a rifling in a barrel of a gun with a tool, the barrel having an axis in a longitudinal direction and a bore defined by an inner wall of the barrel, the bore extending in the longitudinal direction, and wherein the tool has a tool head consisting of an electrically conductive material, the tool head having an outer contour, the outer contour corresponding to a shape of the rifling to be produced, wherein the method comprises:
   passing an electrolyte solution through the bore of the barrel while guiding the tool through the bore of the barrel,
   applying a pulsed electrical voltage to the barrel and tool, with which a direct current is generated, the barrel being an anode and the tool head being a cathode, wherein the outer contour of the tool head and the inner wall of the barrel define a gap which surrounds the tool head and through which the electrolyte solution flows, and
   moving the tool through the bore of the barrel while applying the pulsed electrical voltage and simultaneously rotating the tool about the longitudinal axis, thereby creating grooves on the inner wall,
   wherein the pulsed electrical voltage has time intervals in which the direct current alternatingly flows and does not flow, the time interval in which the direct current does not flow corresponds with a speed at which the electrolyte solution is pumped through the barrel such that the electrolyte solution within the gap is exchanged during the time interval in which the direct current does not flow.

2. The method according to claim 1, wherein the tool is moved through the bore of the barrel by an electronic control.

3. The method according to claim 1, wherein the method further comprises adjusting a temperature of the electrolyte solution before passing through the barrel.

4. The method according to claim 1, wherein the electrolyte solution flows in the same direction in which the tool is guided through the barrel.

5. The method according to claim 1, wherein the electrolyte solution flows in a direction opposite to the direction in which the tool is guided through the bore of the barrel.

* * * * *